United States Patent
Ouyang

(10) Patent No.: US 7,003,106 B2
(45) Date of Patent: Feb. 21, 2006

(54) EFFICIENT METHOD FOR MULTIPLICATION OVER GALOIS FIELDS

(75) Inventor: Jing Zheng Ouyang, San Jose, CA (US)

(73) Assignee: Innomedia, PTE, LTD, Singapore (SG)

( * ) Notice: Subject to any disclaimer, the term of this patent is extended or adjusted under 35 U.S.C. 154(b) by 863 days.

(21) Appl. No.: 10/005,291

(22) Filed: Dec. 4, 2001

(65) Prior Publication Data

US 2003/0128841 A1 Jul. 10, 2003

(51) Int. Cl.
*H04L 9/28* (2006.01)

(52) U.S. Cl. .................... 380/28; 708/1; 708/2; 708/3; 708/200; 380/29; 713/150; 713/164; 713/189

(58) Field of Classification Search ................ 714/784; 380/46

See application file for complete search history.

(56) References Cited

U.S. PATENT DOCUMENTS 6,263,470 B1 * 7/2001 Hung et al. .................. 714/784
6,510,228 B1 * 1/2003 Rose ........................... 380/46

OTHER PUBLICATIONS

Nicolas T. Curtois, "Is AES a Secure Cipher", http://www.cryptosystem.net/aes/, last visit: Jun. 8, 2005.*
Mike Scott, "Rijndael Block Cipher—rijndael.c", Apr. 21, 1999.*
"Federal Information Processsing Standards Publication 197", Nov. 26, 2001.*
Federal Information Processing Standards Advanced Encryption Standard.
Pierre-Antoine Benatar, General Cryptographic Knowledge, 2001.
Chris Woods, Building Secure Frame Relay Virtual Private Networks, 2001.

* cited by examiner

*Primary Examiner*—Kim Vu
*Assistant Examiner*—Ponnoreay Pich
(74) *Attorney, Agent, or Firm*—Timothy P. OHagan

(57) ABSTRACT

The improved AES processing method provides an efficient alternative to both Mips intensive multiplication and to conventional table lookup, used to multiply terms over a Galois field (GF). The improved method takes advantage of the fact that in the GF, any non zero element X can be represented by a power of a primitive element P. The improved method thereby results in a 2 by 256 table. The log base P of the terms being multiplied are looked up and summed, and the anti-log of the sum is looked up in the same table.

1 Claim, 3 Drawing Sheets

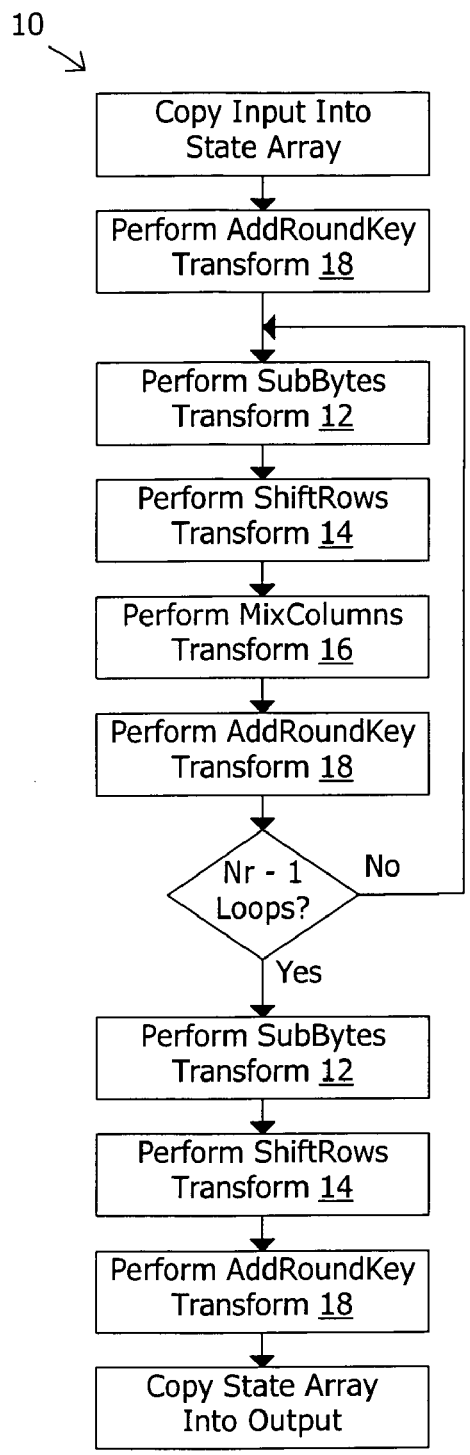
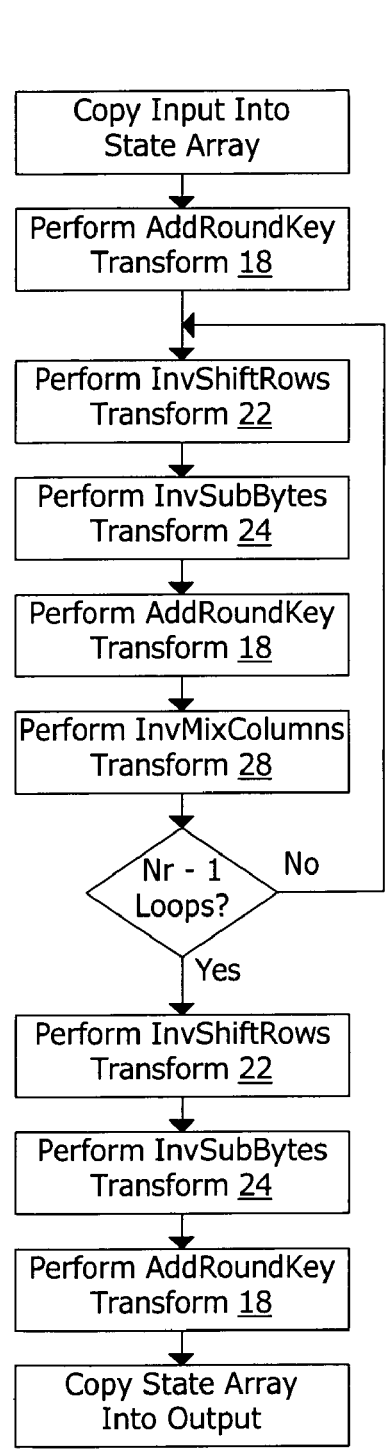
Figure 1a
(Prior Art)
Figure 1b
(Prior Art)

EFFICIENT METHOD FOR MULTIPLICATION OVER GALOIS FIELDS

TECHNICAL FIELD

The present invention relates to encryption algorithms and in particular to the Advanced Encryption Standard (AES) issued by the National Institute of Standards and Technology as part of the Federal Information Processing Standards (FIPS) Publication. The AES specifies an FIPS approved cryptographic algorithm that can be used to protect electronic data. More particularly, the present invention relates to an efficient method of implementation of the AES encryption process.

BACKGROUND OF THE INVENTION

Information shared between government agencies, and between government agencies and contractors, is often sensitive. Such information is generally classified according to guidelines established by the government agency involved. When such classified information requires transmission between secured facilities (e.g., phone conversations, FAXes, or transmission of computer files), a means must be exercised to prevent the information from being intercepted. Also, communications between individuals often include personal or business related content that that the individuals intend to maintain as private.

The National Institute of Standards and Technology has established the Advanced Encryption Standard (AES) as the approved cryptographic algorithm for such transmission. Copies of the AES are available from the National Technical Information Service (NTIS), 5285 Port Royal Road, Springfield, Va. 22161.

The AES specifies the Rijndael algorithm, a symmetric block cipher that can process data blocks of 128 bits, using cipher keys with lengths of 128, 192, and 256 bits. The input and output for the AES algorithm each consist of sequences of 128 bits (digits with values of 0 or 1). The basic unit for processing in the AES algorithm is a byte. The input, output and Cipher Key bit sequences are processed as arrays of bytes that are formed by dividing these sequences into groups of eight contiguous bits to form the arrays of bytes.

All byte values in the AES algorithm will be presented as the concatenation of its individual bit values (0 or 1) between braces in the order $\{b_7, b_6, b_5, b_4, b_3, b_2, b_1, b_0\}$. These bytes are interpreted as finite field elements using a polynomial representation:

$$b_7x^7 + b_6x^6 + b_5x^5 + b_4x^4 + b_3x^3 + b_2x^2 + b_1x + b_0 = \sum_{i=0}^{7} b_ix^i.$$

For example, $\{01100011\}$ identifies the specific finite field element $x^6+x^5+x+1$.

Internally, the AES algorithm's operations are performed on a two-dimensional array of bytes called the State array. The State array consists of four rows of bytes, each containing four bytes. At the start of the Cipher, or of the Inverse Cipher, the input (a two dimensional array of bytes) is copied into the State array. The Cipher or Inverse Cipher operations are then conducted on this State array, after which its final value is copied to the output (a two dimensional array of bytes).

All bytes in the AES algorithm are interpreted as finite field elements. Finite field elements can be added and multiplied, but these operations are different from those used for normal numbers.

In the polynomial representation, multiplication (denoted by ·) in a Galois field (256), i.e., $GF(2^8)$, corresponds with the multiplication of polynomials modulo m(x), where m(x) is an irreducible polynomial of degree 8. A polynomial is irreducible if its only divisors are one and itself. For the AES algorithm, this irreducible polynomial is:

$$m(x)=x^8+x^4+x^3+x+1,$$

or $1\{1b\}$ in hexadecimal notation.

For example, $\{57\}\cdot\{83\}=\{c1\}$, because $$(x^6 + x^4 + x^2 + x + 1)(x^7 + x + 1) = x^{13} + x^{11} + x^9 + x^8 + x^7 +$$
$$x^7 + x^5 + x^3 + x^2 + x +$$
$$x^6 + x^4 + x^2 + x + 1$$
$$= x^{13} + x^{11} + x^9 + x^8 + x^6 + x^5 + x^4 + x^3 + 1 \text{ and}$$
$$x^{13} + x^{11} + x^9 + x^8 + x^6 + x^5 + x^4 + x^3 +$$
$$1 \text{ modulo}(x^8 + x^4 + x^3 + x + 1)$$
$$= x^7 + x^6 + 1.$$

The modular reduction by m(x) ensures that the result will be a binary polynomial of degree less than 8, and thus can be represented by a byte. However, there is no simple operation at the byte level that corresponds to this multiplication.

The multiplication defined above is associative, and the element $\{01\}$ is the multiplicative identity. For any non-zero binary polynomial b(x) of degree less than 8, the multiplicative inverse of b(x), denoted $b^{-1}(x)$, can be found as follows: the extended Euclidean algorithm described in the CRC Press *Handbook of Applied Cryptography*, published in 1997, on pages 81–83, is used to compute polynomials a(x) and c(x) such that:

$$b(x)a(x)+m(x)c(x)=1.$$

Hence, $a(x) \cdot b(x) \mod m(x) = 1$, which means:

$$b^{-1}(x) = a(x) \mod m(x).$$

Moreover, it holds that:

$$a(x) \cdot (b(x) + c(x)) = a(x) \cdot b(x) + a(x) \cdot c(x).$$

It follows that the set of 256 possible byte values, with XOR used as addition and the multiplication defined as above, has the structure of the finite field $GF(2^8)$.

The Cipher is comprised of four individual transformations: SubBytes, ShiftRows, MixColumns, and AddRoundKey. The Mixcolumns transform includes multiplication over a $GF(2^8)$, which multiplication is described above. The Inverse Cipher similarly includes four individual inverse transformations: InvShiftRows, InvSubBytes, InvMixColumns, and AddRoundKey, wherein InvMixColumns also includes multiplication over a $GF(2^8)$. Each call to MixColumns and to InvMixColumns results in sixteen such multiplications. Further, each Cipher or Inverse Cipher operation requires 9, 11, or 13 calls to MixColumns or InvMixColumns respectively, where the number of calls depends on the key length.

As described above, multiplication over the $GF(2^8)$ requires the multiplication of two polynomials, followed by a modulo operation, which is Mips intensive. Alternatively, the multiplication over the $GF(2^8)$ may be performed by table lookup which is much less Mips intensive. Generally such table would comprise a table size of 256×256 which equals 65,536 elements. However, in the case of the AES algorithm, one term in the multiplication is limited to 6 values, so the table size is reduced to 6×256 (i.e., 1536 elements.) However, even reducing the table size to 1536 elements places a burden on memory space.

What is needed is a way to avoid the Mips intensive actual multiplication without placing a burden on memory space.

SUMMARY OF THE INVENTION

The present invention addresses the above and other needs by providing an improved method for multiplying terms over a Galois field (GF). Each Cipher or Inverse Cipher operation of the Advanced Encryption Standard (AES) encryption algorithm requires 9, 11, or 13 calls to Mixcolumns (or to InvMixColumns), and each call to the MixColumns (or to the InvMixColumns), transform results in sixteen multiplications over a Galois field. Know methods of multiplication over a Galois field require Mips intensive multiplication of polynomials followed by a modulo operation or a memory burdening conventional table lookup. The present invention provides an efficient alternative to known methods. The improved method takes advantage of the fact that in the Galois field, any non zero element X can be represented by a power of a primitive element P. The improved method utilizes a 2 by 256 table wherein one row is made up of the 256 elements of the Galois field, and the other row is made up of the log base P of the corresponding element. The logs base P of the terms being multiplied are looked up and summed, and the anti-log of the sum is looked up in the same table.

In accordance with one aspect of the invention, the multiplication of elements of a Galois filed is performed through table look-up using a 2 by 256 table. By utilizing a log table look-up, the size of the table is reduced from 6 by 256 to 2 by 256. The improved method thereby reduces the memory required to perform multiplication over a Galois field.

It is a feature of the present invention to avoid the Mips intensive operations sometimes utilized for multiplication of elements of a Galois filed. A known method of multiplication of elements of a Galois field requires the multiplication of two polynomials (in the case of the AES algorithm, 8 order polynomials) followed by a modulo operation. Such operations are Mips intensive. The use of the log table of the present invention reduces the Mips required and thus speeds up the operation.

For a better understanding of the present invention, together with other and further aspects thereof, reference is made to the following description, taken in conjunction with the accompanying drawings, and its scope will be pointed out in the appended clams.

BRIEF DESCRIPTION OF THE DRAWINGS

FIG. 1A shows a flow chart for the cipher process;

FIG. 1B shows a flow chart for the inverse cipher process;

DESCRIPTION OF THE PREFERRED EMBODIMENTS

Figure 2:
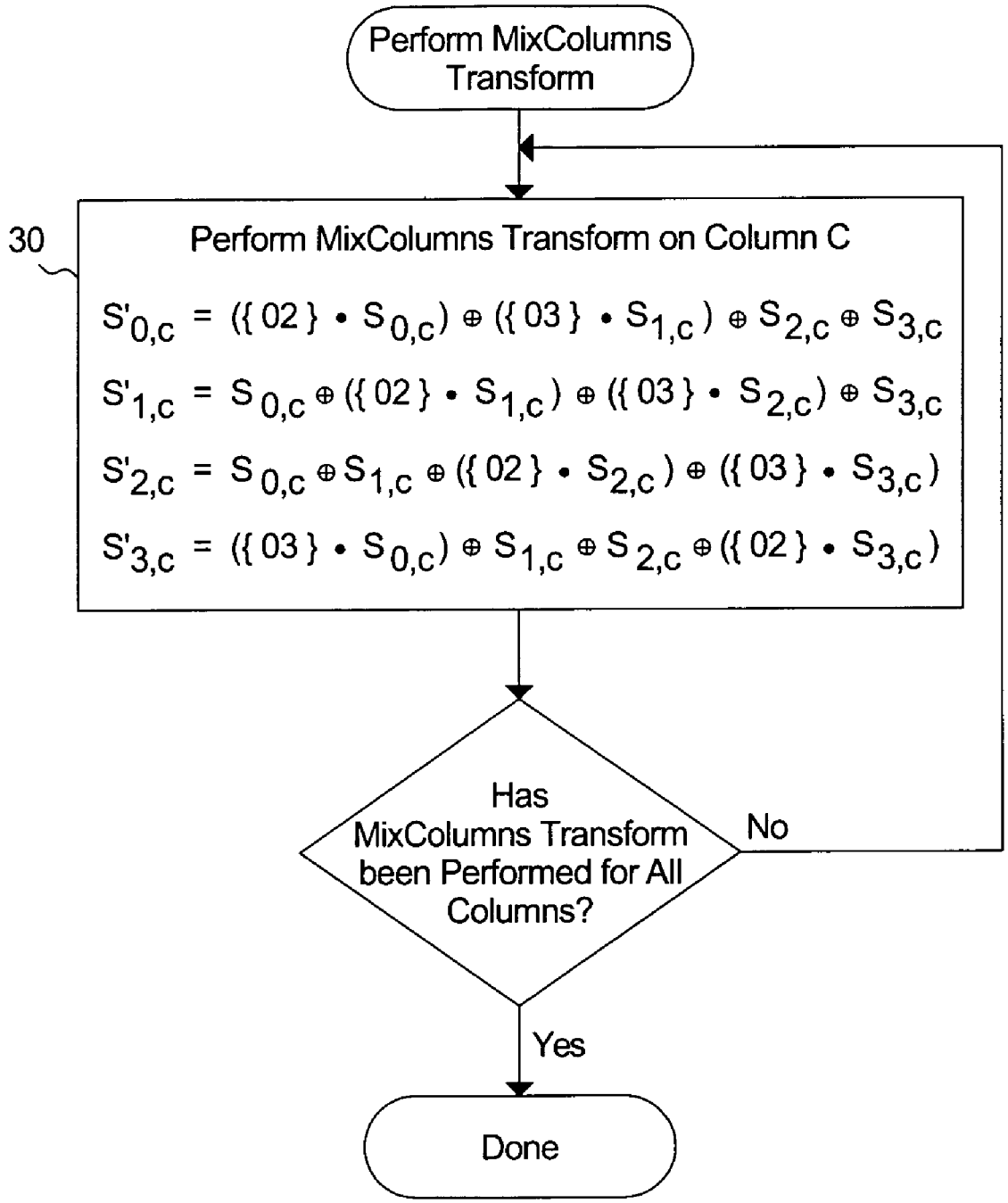
FIG. 2 depicts a more detailed flow chart for the MixColumns transformation.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

The improved encryption processing method of the present invention provides an efficient alternative to both a Mips intensive polynomial multiplication and to a conventional table lookup, used to multiply terms over a finite field. Known encryption methods take advantage of the characteristics of finite field mathematics. For example, a field which is mapped back onto itself by defined addition and multiplication operations has the advantage of guaranteeing that the result of addition or multiplication will have a known number of bit representation. Thus, by improving the efficiency of multiplication of a finite field, the present invention improves the efficiency of the encryption methods.

The improved method takes advantage of the fact that in known finite fields, any non zero element X can be represented by a power of a primitive element P. The improved method utilizes a 2 by n table wherein a first row is made up of the n elements of the finite field, and a second row is made up of the log base P of the corresponding element in the first row. The logs base P of terms being multiplied are looked up and summed, and the anti-log of the sum is looked up in the same table. In a preferred embodiment, the method of the present invention is applied to the multiplications over a Galois field (256) of the AES algorithm described in detail in the Advanced Encryption Standard (AES) issued by the National Institute of Standards and Technology as part of the Federal Information Processing Standards (FIPS) Publication. The Advanced Encryption Standard is incorporated herein by reference.

A flow chart of the cipher 10 used by the AES algorithm for encryption is shown in FIG. 1A. The cipher 10 comprises four transformations: the SubBytes transform 12, the ShiftRows transform 14, the MixColumns transform 16, and the AddRoundKey transform 18. An input (original data) is copied into a State array. The original data could be a voice signal, a signal from a FAX machine, computer files, or any other signal that requires encryption. The AddRoundKey transform 18 is performed on the State array. The four transforms 12, 14, 16, and 18 are executed nine, eleven, or thirteen times, followed by a single execution of transforms 12, 14, and 18. Lastly, the State array is copied into an output (encrypted data).

A flow chart of the inverse cipher 20 used by the AES algorithm for encryption is shown in FIG. 1B. The inverse cipher 20 comprises four transformations: the InvShiftRows transform 22, the InvSubBytes transform 24, the AddRoundKey transform 18, and the InvMixColumns transform 28. An input (encrypted data) is copied into a State array. The AddRoundKey transform 18 is performed on the State array. The four transforms 22, 24, 18, and 28 are executed nine, eleven, or thirteen times, followed by a single execution of transforms 22, 24, and 18. The State array is lastly copied into an output (original data).

The processing performed by the MixColumns transform 16 (and the InvMixColumns transform 28) is shown in a flow chart in FIG. 2. The MixColumns transform 16 operates on each column of the State array independently, treating each column as a four-term polynomial with coefficients over $GF(2^8)$, as described in the AES algorithm, and recursively transforming each column by multiplying each column by a fixed four term polynomial $a(x)$ to obtain an updated column, where $a(x)$ is:

$$a(x)=\{03\}x^3+\{01\}x^2+\{01\}x+\{02\}$$

The multiplication by $a(x)$ can be written in the form of a transformation matrix being multiplied times a column of the State array as:

$$\begin{bmatrix} s'_{0,c} \\ s'_{1,c} \\ s'_{2,c} \\ s'_{3,c} \end{bmatrix} = \begin{bmatrix} 02 & 03 & 01 & 01 \\ 01 & 02 & 03 & 01 \\ 01 & 01 & 02 & 03 \\ 03 & 01 & 01 & 02 \end{bmatrix} \begin{bmatrix} s_{0,c} \\ s_{1,c} \\ s_{2,c} \\ s_{3,c} \end{bmatrix} \text{ for } 0 \leq c < Nb$$

where c is the column number and Nb is 4, with the result that the four bytes in a column are transformed by:

$$s'_{0,c}=(\{02\}\cdot s_{0,c})\oplus(\{03\}\cdot s_{1,c})\oplus s_{2,c}\oplus s_{3,c}$$

$$s'_{1,c}=s_{0,c}\oplus(\{02\}\cdot s_{1,c})\oplus(\{03\}\cdot s_{2,c})\oplus s_{3,c}$$

$$s'_{2,c}=s_{0,c}\oplus s_{1,c}\oplus(\{02\}\cdot s_{2,c})\oplus(\{03\}\cdot s_{3,c})$$

$$s'_{3,c}=(\{03\}\cdot s_{0,c})\oplus s_{1,c}\oplus s_{2,c}\oplus(\{02\}\cdot s_{3,c})$$

Based on the definitions provided in the AES algorithm description, each term of the result of the transformation includes two multiplies (represented by the · operator) over the $GF(2^8)$. The definition of multiplication over $GF(2^8)$ comprises the multiplication of two polynomials followed my a modulo operation, which combination of operations is Mips intensive.

The MixColumns transform 16 includes multiplication by only two constant elements, {02} and {03}. Similarly, the InvMixColumns transform 28 includes multiplication by only four constant terms, {0b}, {0d}, {09}, and {0e}. There are therefore a total of 6 constant elements that are always one of the elements in the multiplication over the $GF(2^8)$ in the AES algorithm. Thus, the multiplication of polynomials could be replaced by a conventional table look-up, requiring a 6 by 256 element table, however even a relaxed requirement for a 6 by 265 table places a burden upon memory.

The present invention replaces both the polynomial multiplication, and the conventional table lookup, by a 2 by 256 primitive power and log table, and the steps of: looking up the log of the terms being multiplied, summing the logs, and looking up the anti-log of the sum. The method of the present method avoids both the Mips intensive multiplication, and the burden on memory of the 6 by 256 table. The other steps of the AES algorithm may be carried out as they would normally be.

Figure 3:
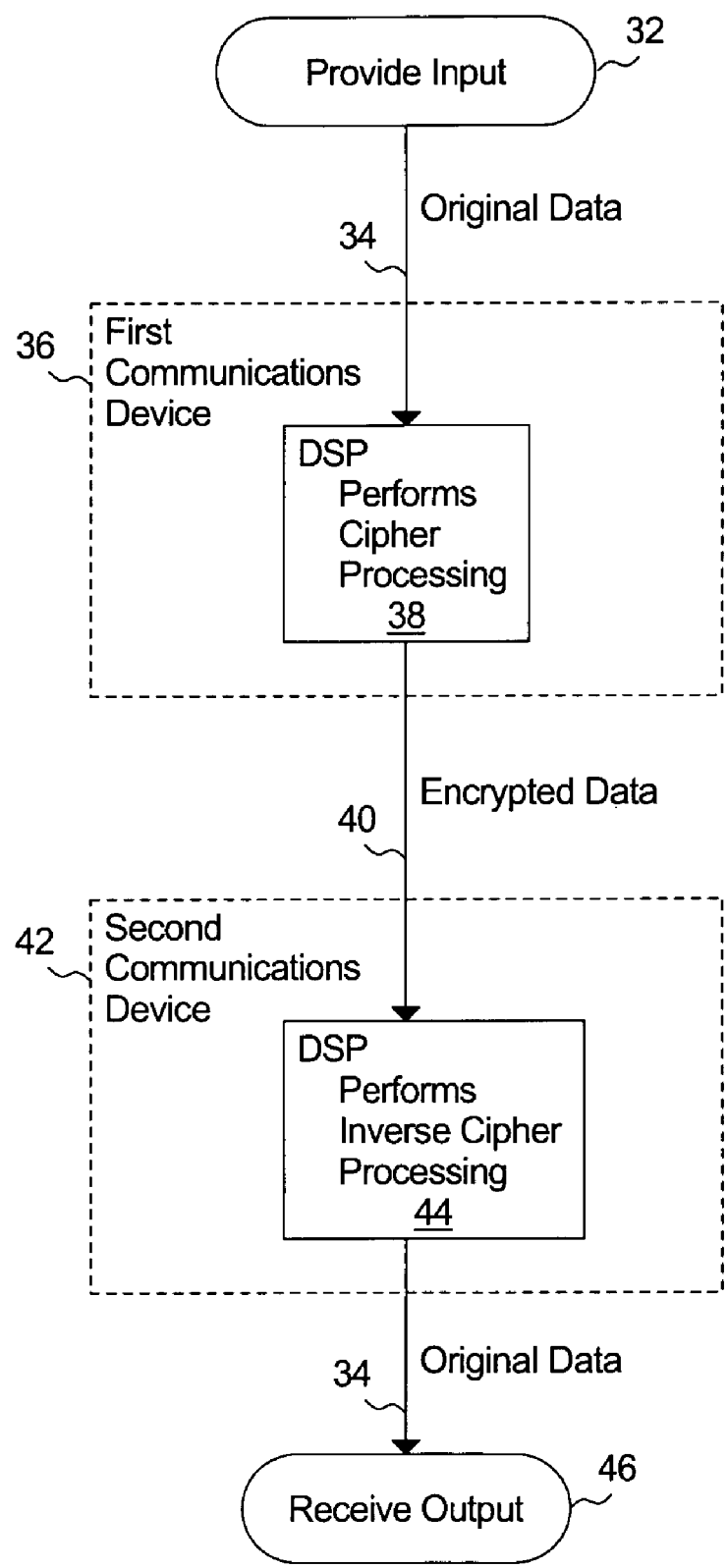
FIG. 3 shows a block diagram of a typical communications system utilizing the present invention.

A flow chart of a communications system utilizing the present invention is shown in FIG. 3. Provide input 32 provides original data 34 to a first communications device 36. A Digital Signal Processor (DSP) 38 circuit residing within the first communications device 36 performs cipher processing on the original data 32 to produce an encrypted signal 40. The encrypted signal 40 is transmitted from the first communications device 36 to a second communications device 42. A second DSP 44 circuit residing within the second communications device 42 performs inverse cipher processing on the encrypted signal to recover the original data 34. The original data 34 is then provided to receive output 46.

Those skilled in the art will recognize that any signal may be digitized and processed by the communications system of FIG. 3. Signal may also flow from the second communications device 42 to the first communications device 36, and multiple communications devices may take part in the overall system. These various modes of operation are intended to some within the scope of the present invention.

Those skilled in the art will further recognize that other encryption methods may include multiplication over a Galois field, or other finite fields. The use of a primitive power and log table to reduce Mips or memory required to perform such multiplication in any encryption method is intended to fall within the scope of the present invention.

While the invention herein disclosed has been described by means of specific embodiments and applications thereof, numerous modifications and variations could be made thereto by those skilled in the art without departing from the scope of the invention set forth in the claims.

What is claimed is:

1. An improved method for encryption implemented via hardware circuit(s) including multiplication over a finite field, the improvement comprising:

obtaining the result of multiplication over a finite field using a primitive power and log table comprising 2 rows, wherein obtaining the result of multiplication over the finite field comprises obtaining the result of multiplication over a Galois field($2^8$) performed in the MixColumns transformation and in the InvMixColumns transformation of the AES algorithm using a 2 by 256 primitive power and log table, comprising the steps of:

looking up logs of terms being multiplied over the Galois field($2^8$);

summing the logs to obtain a sum; and looking up the anti-log of the sum.

* * * * *